Patented Dec. 19, 1950

2,535,012

UNITED STATES PATENT OFFICE 2,535,012

PROCESS FOR PRODUCING ALDEHYDIC ACID ESTER ACETALS

Willard J. Croxall, Bryn Athyn, and Henry J. Schneider, Philadelphia, Pa., assignors to Rohm & Haas Company, Philadelphia, Pa., a corporation of Delaware No Drawing. Application October 2, 1948, Serial No. 52,607

16 Claims. (Cl. 260—484)

This invention deals with the preparation of esters. It concerns reacting acetylene in the presence of an alkaline catalyst with a normal ester of carbonic acid and a monohydric alcohol, the non-hydroxyl residue of which is free of acidic hydrogen or groups reacting with a strong alkali. In this reaction, there are formed esters of a just-defined alcohol and carboxylic acids having an ether group, the O-substituent of which corresponds to the non-hydroxylated residue of said monohydric alcohol.

As an alkaline catalyst, there may be used (1) any of the alkali metal acetylides, both mono- and di-, such as, for example, lithium acetylide, sodium acetylide, potassium acetylide, rubidium acetylide, cesium acetylide, disodium acetylide, or dipotassium acetylide, etc., (2) an alkali metal alcoholate, especially an alcoholate of such metal having an atomic weight of at least twenty-three and preferably of a monohydric alcohol of not over twelve carbon atoms and of the kind described above in the description of the carbonic acid esters, and (3) a quaternary ammonium alcoholate, the quaternary group of which is capable of forming a quaternary ammonium hydroxide and is free of radicals which readily form olefins by thermal degradation, the alcoholate group thereof being derived from a monohydric aliphatic alcohol of one to four carbon atoms.

The alkali metal alcoholate may be formed from any of the monohydric alcohols used to form the carbonic acid esters, but it need not be formed from the same alcohol. For purposes of economy, it is desirable to use an alcohol of small molecular size, such as sodium or potassium methoxide, ethoxide, or butoxide. Yet, since this alcoholate group may be later found in by-product esters of the ether-acids among the desired end compounds, it may be wished to avoid these traces of by-products and to use an alkali metal alcoholate corresponding to the alcohol residue of the reacting ester of carbonic acid.

The alcohols used to form the alkali metal alcoholates may be primary, secondary, or tertiary, normal or iso, saturated or unsaturated. Typical alcohols which may be used include methyl, ethyl, propyl, butyl, amyl, hexyl, heptyl, octyl, nonyl, decyl and dodecyl, allyl, methallyl, crotyl, benzyl, or cyclohexyl alcohols. The alcohols may contain other than the hydrocarbon group, such as occurs in the above-recited compounds, so long as the non-hydroxylated residue of the alcohol is free of a group reacting with an alkali metal. Thus, the alcohol used for the formation of an alkali metal alcoholate may contain an ether group, or a thioether group, or an amino group, and thus be any of the alcohols which are used for forming the carbonic acid esters.

As effective quaternary ammonium alcoholates, there are used quaternary ammonium alcoholates in which an alkoxide group having one to four carbon atoms is one of the five N-substituents and two to four of the N-substituents are supplied by the methyl group, while the benzyl nucleus may be used to complete the required number of N-substituents to form a quaternary group. The alkoxide group may be one such as methoxide, ethoxide, propoxide, or tert.-butoxide. There may be used such benzyl nuclei as methylbenzyl, ethylbenzyl, propylbenzyl, isopropylbenzyl, tert.-butylbenzyl, octylbenzyl, iso-octylbenzyl, tert.-octylbenzyl, bromobenzyl, chlorobenzyl, phenylbenzyl, methoxybenzyl, ethoxybenzyl, methoxymethylbenzyl, etc. It is preferred that the molecular weight of the substituting groups in the phenyl ring of the benzyl nucleus be not over 120.

Typical of the quaternary ammonium alcoholates which may be used are tetramethyl ammonium methoxide, tetramethyl ammonium tert.-butoxide, trimethyl benzyl ammonium methoxide, trimethyl benzyl ammonium ethoxide, dimethyl dibenzyl ammonium methoxide, dimethyl di(chlorobenzyl) ammonium methoxide, dimethyl di(methylbenzyl) ammonium ethoxide, trimethyl methylbenzyl ammonium tert.-butoxide, trimethyl butylbenzyl ammonium tert.-butoxide, trimethyl 2,4,6,8 - tetramethyloctylbenzyl ammonium methoxide, trimethyl di(isopropyl)-benzyl ammonium methoxide, trimethyl methoxybenzyl ammonium methoxide, dimethyl di(chlorobenzyl) ammonium propoxide, etc.

There are other alkaline agents which might be taken as catalysts, such as sodium metal, potassium metal, sodium hydride, or sodium amide. These do not offer any particular advantage as catalysts, as apparently they react promptly with acetylene to form in situ alkali acetylides. They may, therefore, be considered as the equivalents of the above-defined catalysts.

The proportion of catalyst used may vary within wide limits. Thus, the desired end products are obtained when one mole of catalyst is used per mole of carbonate ester. On the other hand, as small amounts of catalyst as one mole thereof per eighty moles of carbonate ester are successfully used. The preferred molar ratios of catalyst to carbonate ester vary from one to ten to one to twenty for alkali metal acetylides or alcoholates, while in the case of quaternary ammonium alcoholates the optimum range of catalyst varies from one to ten to one to sixty for the ratio of catalyst to carbonate on a molar basis.

Useful esters of carbonic acid are formed with any monohydric alcohol, ROH, the radical R of which is free of acidic hydrogen and groups reacting with a strong alkali, a rather evident limitation for a system in which alkaline catalysts are to be used. This requirement excludes the presence of acidic groups or groups which readily yield an acidic function, such as esters, amides, acid halides, anhydrides, and the like, or aldehydo groups, or the sulfhydryl group, and nitro compounds having an acidic hydrogen. The group R may be any hydrocarbon group which forms a monohydric alcohol with a hydroxyl group. The hydrocarbon group may be saturated or unsaturated, of straight or branched chain, and may be an aliphatic, cycloaliphatic, or aralkyl group to which the hydroxyl group is joined at a non-tertiary carbon atom thereof. Thus, the alcohol may be primary or secondary, and this holds whether R is a hydrocarbon group or a substituted group.

Typical of the group R as a hydrocarbon are methyl, ethyl, propyl, isopropyl, butyl, isobutyl, sec.-butyl, amyl, hexyl, heptyl, isoheptyl, octyl, isooctyl, isononyl, dodecyl, octadecyl, 2-ethylbutyl, 2-ethylhexyl, sec.-octyl, 2-ethylnonyl, allyl, methallyl, crotyl, oleyl, undecenyl, cinnamyl, benzyl, methylbenzyl, butylbenzyl, cyclohexyl, methylcyclohexyl, and the like.

The group R may contain an ether linkage, as in methoxyethanol, methoxyethoxyethanol, ethoxyethanol, ethoxyethoxyethanol, ethoxyethoxyethoxyethanol, butoxyethanol, phenoxyethanol, allyloxyethanol, methallyloxyethoxyethanol, benzyloxyethanol, octyloxyethanol, octyloxyethoxyethanol, dodecyloxyethoxyethanol, methoxypropanol, ethoxypropanol, butoxypropanol, butoxypropoxyethanol, phenoxyethanol, phenoxypropanol, butylphenoxyethoxyethanol, etc. The ether alcohols may be summarized by the formula $$R_0(OC_nH_{2n})_xOH$$

wherein $x$ is an integer from one to three, $n$ is a whole number from two to three, and $R_0$ is a hydrocarbon group, particularly such group of one to twelve carbon atoms.

A different type of ether is found in tetrahydrofurfuryl alcohol, which is a valuable starting material for the preparation of compounds by the process of this invention.

Instead of an oxygen ether alcohol, there may be used as a starting material in preparing a carbonic acid ester an alcohol containing a sulfide linkage, such as ethylthioethanol, ethylthiopropanol, butylthioethanol, butylthiopropanol, phenylthioethanol, benzylthioethanol, cyclohexylthioethanol, and octylthioethanol. It is preferred that these alcohols contain not over twelve carbon atoms.

Another useful type of monohydric alcohol includes amino alcohols. Examples of these include dimethylaminoethanol, diethylaminoethanol, dimethylaminopropanol, ethylaminoethanol, aminoethanol, and the like. It is preferred that these alcohols contain a tertiary amino group and not over twelve carbon atoms.

The various monohydric alcohols shown above are illustrative of the types of alcohols which are useful in the preparation of esters of carbonic acid for use as starting materials for the new reaction here disclosed. As will be seen, the reaction is broadly applicable to any carbonate ester which can be prepared and which contains alcohol residues which do not react in the presence of alkali. A simple test is thus applicable, namely, one for determining whether a given substituted alcohol reacts with a solution of an alkali hydroxide or not.

The monohydric alcohols are used to form diesters of carbonic acid of the formula $$RO-\underset{\underset{O}{\|}}{C}-OR$$

by known methods. It is these esters which are reacted with acetylene in the presence of an anhydrous alkaline catalyst.

The reaction is effected at normal, reduced, or increased pressures and at temperatures between 20° C. and 110° C. A range of 40° to 90° C. is generally preferred, since the reaction runs smoothly with optimum yield under these conditions. The reaction may be run without or with anhydrous, inert organic solvents, such as ethyl ether, isopropyl ether, toluene, xylene, and the like, including aromatic naphthas. An excess of the carbonate ester being reacted is often the most desirable solvent and may readily be separated at the end of the reaction.

Acetylene gas is usually run into a carbonate ester catalyst mixture. The acetylene frequently reacts so rapidly that the reaction mixture is under considerably reduced pressure. The acetylene may be diluted with an inert gas, such as nitrogen, if desired. Again, the acetylene may often be supplied under pressure and has been successfully pressed in at seventy-five pounds per square inch pressure with pure acetylene or up to 450 pounds per square inch for a mixture of 50% acetylene and 50% nitrogen. Temperatures may be controlled in part by the rate of supply of acetylene and/or by cooling. In some cases, it has been found helpful to inoculate a fresh reaction batch with a few per cent of an ester of the β-ether-substituted acrylic acids such as formed in the reaction. This procedure serves to accelerate the reaction in many cases.

When the reaction of acetylene and carbonic ester appears essentially complete, as shown, for example, by lack of absorption of acetylene, the catalyst is destroyed, as by addition of an acidic substance. There may be added hydrochloric, sulfuric, acetic, or other acid. The organic layer which results may be washed and dried.

The reaction mixture is desirably subjected to fractional distillation. The first fractions contain alcohol and unreacted carbonate. There are then obtained acrylates having an ether group in the β-position and related ether propionates. These two types of products are usually separable on careful refractionation. In cases where the ester products are formed with lower alcohols, there may be obtained by distillation under reduced pressure succinates and maleates in which ether groups occur or an ether group occurs on a carbon atom contiguous to a carbonyl group. In the case of esters from alcohols of large molecular size, the succinates and maleates remain in the residue from the distillation of acrylates and propionates. For some purposes, it should be remarked, it is not necessary to separate acrylates and propionates, and they may be collected in a single fraction. This fraction may be used as a chemical intermediate. It is also useful as a softener and plasticizer, as are the separate esters obtainable by the process of this invention. Furthermore, the propionic acid esters are convertible to the corresponding acrylic acid esters when heated with an acidic or basic catalyst and de-alcoholated.

The following examples are illustrative of the process of this invention.

EXAMPLE 1

Into a five-liter, three-necked flask, equipped with a gas-tight stainless steel stirrer, the blades of which scrape the bottom of the flask, there was charged three hundred cc. of anhydrous ethanol denatured according to Formula 2B. To the stirred alcohol, twenty-nine grams of $\frac{1}{4}''$ cubes of clean sodium was added over a period of two hours. When all the sodium had dissolved, the excess ethanol was demoved by distilling under vacuum, leaving the sodium ethoxide as a dry powder. To the sodium ethoxide 2213 grams of anhydrous diethyl carbonate was added, with stirring, at room temperature.

The flask was then equipped with a gas inlet tube extending into the liquid, a thermometer, and a gas outlet tube connected to a mercury-filled open-end manometer. After the flask was flushed with nitrogen, the mixture was heated to 80°–85° C. and acetylene, which was drawn from a commercial cylinder and scrubbed with water and then with concentrated sulfuric acid and which was dried with soda lime, was pressed in at a pressure of nine to ten inches of mercury above atmospheric. The batch absorbed eighty-two grams of acetylene over a period of seven hours, after which time the rate of absorption became slow. The reactor was cooled to room temperature with the reaction vessel maintained under pressure with acetylene.

There was added dropwise, with stirring, 326 grams of 23% aqueous acetic acid, whereupon two layers developed.

The upper layer of oil was separated. The water layer was extracted with ether. This ether extract and the oil layer were combined and fractionated in the following way:

After a small forerun a fraction ($a$) was taken off between 78° C. and 126° C. at atmospheric pressure, amounting to 1566 grams. This was found to consist of ethyl alcohol and diethyl carbonate. The distillation was continued under reduced pressure.

A fraction ($b$) was obtained between 65° C. and 75° C. at two to four mm. pressure. This fraction had a refractive index of 1.4151 and was found to be a mixture consisting of 8% of ethyl $\beta$-ethoxyacrylate and 92% of ethyl $\beta,\beta$-di(ethoxy)propionate. A part of this fraction was carefully redistilled through a packed column. From 140 grams of fraction ($b$), there was obtained eight grams of pure ethyl $\beta$-ethoxyacrylate, having a refractive index, $n_D^{20}$, of 1.4471; a density, $$d_{20}^{20}$$

of 0.9973, and a saponification number of 391, which by analysis contained 57.96% of carbon and 8.50% of hydrogen (theory for $C_7H_{12}O_3$ is 58.33% of carbon and 8.33% of hydrogen). There was obtained an intermediate fraction of thirty grams having a refractive index of 1.4227 and a saponification number of 330. This contained 30% of ethyl $\beta$-ethoxyacrylate and 70% of ethyl $\beta,\beta$-diethoxypropionate. There was then obtained a fraction, boiling at 94.0°–94.5° C./16 mm., having a refractive index of 1.4123, a density, $$d_{20}^{20}$$

of 0.9735, and a saponification number of 297. This was found to have 56.90% of carbon and 9.91% of hydrogen, corresponding in composition to ethyl $\beta,\beta$-diethoxypropionate, for which the theoretical percentage of carbon is 56.86% and of hydrogen, 9.46%.

An intermediate fraction ($c$) was taken from the main distillation at 75° C./4 mm.–112° C./3 mm., amounting to twelve grams and having a refractive index of 1.4170. This was found to be a mixture of ethyl $\beta,\beta$-diethoxypropionate and diethyl $\alpha,\alpha$-diethoxysuccinate.

There was then taken off a fraction ($d$) between 112° C. and 114° C. at 3 mm., having a refractive index, $n_D^{20.5}$, of 1.4310. This was found to be diethyl $\alpha,\alpha$-diethoxysuccinate. By analysis, it contained 54.95% of carbon and 8.11% of hydrogen (theory, 54.96% of carbon and 8.40% of hydrogen).

There was also obtained a fraction of 117 grams boiling above 114° C./3 mm.

To a portion of ninety-six grams of fraction ($b$) was added 0.2 gram of sodium hydrogen sulfate, and this mixture was heated in a flask equipped with a two-foot column packed with glass helices and tapped with a partial take-off condenser. There were obtained (1) twenty-one grams of liquid, boiling at 78°–78.5° C., which was ethanol, and (2) sixty-two grams of liquid, boiling at 102.5°–103° C./34 mm., having a density, $$d_{20}^{20}$$

of 0.9973; a refractive index, $n_D^{20}$, of 1.4471, and a saponification number of 391. This fraction proved to be ethyl $\beta$-ethoxyacrylate. There was also obtained a fraction (2.3 grams) of higher-boiling material.

A convenient method for the rapid analysis of fractions consisting of ethyl $\beta,\beta$-diethoxypropionate and ethyl $\beta$-ethoxyacrylate is through the refractive index and reference thereof to the index determined for mixtures. Pure materials were mixed in known weights and the refractive indices of the resulting mixtures determined, as shown in the table.

Table

| Weight Per Cent Ethyl $\beta,\beta$-Diethoxy-propionate | Weight Per Cent Ethyl $\beta$-Ethoxy-acrylate | Refractive Index, $n_D^{20}$ |
| --- | --- | --- |
| 100.0 | 0.0 | 1.4123 |
| 91.6 | 8.4 | 1.4151 |
| 73.0 | 27.0 | 1.4217 |
| 49.4 | 50.6 | 1.4298 |
| 23.4 | 76.6 | 1.4386 |
| 10.0 | 90.0 | 1.4437 |
| 0.0 | 100.0 | 1.4471 |

This same type of analysis is conveniently applied to other mixtures of oxypropionates and oxyacrylates and the like.

EXAMPLE 2

In a one-liter, three-necked flask, thirty-four grams of powdered sodium ethoxide was prepared by the procedure of Example 1. To this there was added, with stirring, 590 grams of anhydrous diethyl carbonate. Seventy-two grams of ethyl $\beta$-ethoxyacrylate was also added with cooling.

The flask was equipped as in Example 1. The batch therein was heated to 80°–85° C. and fortyone grams of acetylene was pressed in at nine to ten inches of mercury above atmospheric pressure over a period of three hours, at which time the absorption of acetylene became slow. The flask was cooled to room temperature with acetylene running in. Then 130 grams of 23% aqueous acetic acid was added dropwise, with stirring, whereupon two layers developed. The upper layer of oil was separated and fractionated in the following way.

A fraction (a) was taken off at 78° C. to 126° C., amounting to 390 grams. This consisted chiefly of ethanol and diethyl carbonate.

The pressure was then reduced, and a small amount of liquid was taken off under reduced pressure. There was then obtained a fraction (b) of two hundred grams, distilling at 60°–75° C. at 2 mm. Since it had a refractive index of 1.4122, it was practically pure ethyl β,β-diethoxypropionate.

The next fraction (c) was taken at 75° C./2 mm.–110° C./5 mm., amounted to eleven grams, and had a refractive index, $n_D^{20}$, of 1.4150. It consisted of about 90% of ethyl β,β-diethoxypropionate and 10% of diethyl α,α-diethoxysuccinate.

A fourth fraction (d) of fourteen grams was taken at 110°–115° C./5 mm. It was diethyl α,α-diethoxysuccinate and had a refractive index, $n_D^{20}$, of 1.4305. There remained fifty-eight grams of higher-boiling material.

EXAMPLE 3

Into a five-liter, three-necked flask, there was charged 2250 grams of dimethyl carbonate. To this there was added, with stirring, at room temperature 128 grams of commercial sodium methoxide.

The flask was then equipped as in Example 1. The batch was heated to 55°–65° C., and 213 grams of acetylene was pressed in over a period of seven hours. Six hundred fifty grams of 23% acetic acid was added, with stirring, whereupon two layers were formed. The lower layer of oil was separated and fractionally distilled.

The first fraction (a), amounting to 1351 grams, was taken off between 60° C./atm. and 65° C./25 mm. It was composed chiefly of methanol and dimethyl carbonate.

A second fraction (b) was distilled at 46°–49° C./2 mm., amounting to 269 grams. This was carefully redistilled through a packed column. After a forerun which contained about two grams of methyl β-methoxyacrylate, there was obtained about 260 grams of liquid, boiling at 77° C./19 mm. and having a refractive index, $n_D^{20}$, of 1.4095; a density, $$d_{20}^{20}$$

of 1.0445, and a saponification number of 379. It corresponded in composition to methyl β,β-dimethoxypropionate.

A third fraction (c), obtained at 50°–99° C./5 mm. and amounting to twenty-one grams, was found to be a mixture of methyl β,β-dimethoxypropionate and dimethyl α,α-dimethoxysuccinate.

A fourth fraction (d) was taken at 99°–106° C./5 mm., amounting to 187 grams. It was refractionated through a packed column to give a liquid boiling at 92° C./2 mm. and having a refractive index, $n_D^{20}$, of 1.4335; a density, $$d_{20}^{20}$$

of 1.1964, and a saponification number of 541. By analysis, this compound contained 46.46% of carbon and 7.04% of hydrogen, the theoretical values of dimethyl α,α-dimethoxysuccinate being 46.60% of carbon and 6.80% of hydrogen.

EXAMPLE 4

Into a two-liter, three-necked flask equipped with a gas-tight stainless steel stirrer, there were charged approximately eight hundred cc. of anhydrous liquid ammonia and thirty-seven grams of redistilled n-butanol. To this there was added, with stirring, 11.5 grams of sodium metal in ¼" squares, whereupon a deep blue color appeared. After this color had completely disappeared, the ammonia was evaporated, leaving the sodium n-butoxide as a white powder, from which the last traces of ammonia were removed by vacuum. To this powder there was added, with stirring, 522 grams of di-n-butyl carbonate at room temperature.

The flask was then equipped with thermometer and gas inlet and outlet tubes. The batch was heated to 80°–85° C. and acetylene, which was drawn from a commercial cylinder and scrubbed as in Example 1, was pressed in at nine to ten inches of mercury above atmospheric pressure. Over a period of seven hours, thirty-one grams of acetylene was absorbed, after which time the absorption became slow. The reactor was cooled to room temperature with the reaction vessel maintained under pressure with acetylene.

There was then added, with stirring, 130 grams of 23% aqueous acetic acid, whereupon two layers developed. The upper layer of oil was separated, washed with water, dried over anhydrous potassium carbonate, and fractionally distilled.

The first distillate was obtained at 105° to 207° C. It consisted of n-butanol and di-n-butyl carbonate.

A fraction of 144 grams was then taken off at 110° C.–135° C./5 mm. This was redistilled through a packed column with separation into two distinct products. The first, amounting to fifty-one grams, boiled at 113°–115° C./6 mm. and had a refractive index, $n_D^{20}$, of 1.4505; a density, $$d_{20}^{20}$$

of 0.9465, and a saponification number of 289. This product was identified as butyl β-butoxyacrylate, having a carbon content of 66.12% and a hydrogen content of 9.64%, compared with the theoretical values of 66.0% for carbon and 10.0% of hydrogen for $C_{11}H_{20}O_3$.

There was also obtained in this refractionation 78.5 grams of a liquid distilling at 133°–134° C./3 mm., having a refractive index, $n_D^{20}$, of 1.4278 and a density, $$d_{20}^{20}$$

of 0.9268 and having a carbon content of 66.04% and a hydrogen content of 11.46%, as compared to theoretical values of 65.69% and 10.95%, respectively, for butyl β,β-dibutoxypropionate.

From the original distillation, there was also obtained eighty-one grams of a high-boiling material. This gave on refractionation dibutyl α,α-dibutoxysuccinate, boiling at 155°–167° C./2 mm. and having a refractive index of 1.4368 and a saponification number of 308.

EXAMPLE 5

Into a one-liter, three-necked flask equipped with a gas-tight stainless steel stirrer, there were charged approximately four hundred cc. of anhydrous liquid ammonia and 25.5 grams of 2-ethyl butanol. There was added, with stirring, 5.8 grams of sodium in ⅛" cubes, whereupon a blue color developed. When all of this color had disappeared, the ammonia was evaporated, leaving the sodium 2-ethyl butoxide as a white powder.

There was added at room temperature, with stirring, 341 grams of di-2-ethyl butyl carbonate. The flask was equipped with a gas inlet tube, a gas outlet tube, and thermometer. After the flask and contents had been flushed with nitrogen, the batch was heated to 80°–85° C. and acetylene, which was drawn from a commercial cylinder and scrubbed and dried as in Example 1, was pressed in at ten inches of mercury pressure above atmospheric. Over a period of five hours, after which time the acetylene absorption became slow, the batch absorbed nineteen grams of acetylene. The mixture was cooled to room temperature with the reaction vessel maintained under pressure with acetylene.

There was added, with stirring, sixty-five grams of 23% aqueous acetic acid, whereupon two layers developed. The upper layer of oil was separated and fractionally distilled.

The first fraction (a) was taken at 45°–120° C./3 mm. It amounted to 142 grams and consisted of 2-ethylbutanol and di-2-ethylbutyl carbonate.

There was then obtained a fraction (b) distilling at 147°–167° C./3 mm. This had a refractive index of 1.4427 and was found to consist of 7% of 2-ethylbutyl β-2-ethylbutoxyacrylate and 93% of 2-ethylbutyl β,β-di-2-ethylbutoxypropionate.

A third fraction (c) amounted to 115 grams, distilling at 177°–180° C./3 mm. and having a refractive index of 1.4412. This was redistilled to give 109 grams of liquid boiling at 133°–135° C/0.05 mm.–0.10 mm. and having a refractive index, $n_D^{20}$, of 1.4398 and a saponification number of 157. By analysis, it contained 70.87% of carbon and 11.83% of hydrogen compared to 70.39% of carbon and 11.73% of hydrogen in 2-ethylbutyl β,β-di-2-ethylbutoxypropionate.

There remained from the distillation flask a residue of ten grams which was too high-boiling for distillation without resort to special techniques, such as molecular stills. This residue contained di-2-ethylbutyl di-2-ethylbutoxysuccinate.

EXAMPLE 6

Into a two-liter, three-necked flask equipped with a gas-tight stainless steel stirrer, there was charged 250 cc. of allyl alcohol. There was added, with stirring, 11.5 grams of sodium in ¼" cubes over a period of two hours. When all of the sodium had dissolved, the excess alcohol was distilled in vacuo, leaving the sodium alloxide as a white powder.

To the dry alloxide there was added, with stirring, 426 grams of diallyl carbonate. The flask was equipped with a gas inlet tube, gas outlet tube, and thermometer. After the apparatus was flushed with nitrogen, the batch was heated to 80°–85° C. and acetylene, which was drawn from a commercial cylinder and scrubbed and dried as in Example 1, was pressed in at ten inches of mercury pressure above atmospheric. Over a period of five hours, after which time the absorption of acetylene became slow, eleven grams of acetylene was absorbed. The batch was cooled to room temperature with the reaction vessel maintained under pressure with acetylene.

There was added dropwise, with stirring, 130 grams of 23% aqueous acetic acid, whereupon two layers developed. The upper oil layer was separated and fractionally distilled. The following fractions were obtained:

The first fraction (a) distilled at 65°–80° C./20–30 mm. and consisted of 269 grams of allyl alcohol and diallyl carbonate.

A second fraction (b) amounted to forty-four grams, distilling at 103°–120° C./4 mm. and having a refractive index, $n_D^{20}$, of 1.4557 and a saponification number of 258. This was a mixture consisting of 10.5% of allyl β-alloxyacrylate and 89.5% of allyl β,β-dialloxypropionate. On careful redistillation, pure allyl β,β-dialloxypropionate was obtained, containing by analysis 63.76% of carbon and 8.13% of hydrogen (theory, 63.71% and 7.93%, respectively), having a refractive index, $n_D^{20}$, of 1.4528 and a density, $d_{20}^{20}$ of 0.9973, and boiling at 90°–91° C./<1 mm.

A third fraction (c), amounting to twenty-three grams of higher-boiling material containing diallyl α,α-dialloxysuccinate, was obtained.

EXAMPLE 7

In a one-liter, three-necked flask, there was prepared 46.5 grams of powdered sodium methalloxide by using the procedure of Example 4. To the powdered methalloxide there was added, with stirring, 510 grams of dimethallyl carbonate at room temperature.

The flask was then equipped with gas inlet and outlet tubes and thermometer, and the batch was heated to 80°–85° C. Acetylene, which was drawn from a commercial cylinder and scrubbed as in Example 1, was pressed in at ten to eleven inches of mercury above atmospheric pressure for seven hours, at which time the absorption became slow. The reactor was cooled to room temperature with the reaction vessel maintained under pressure with acetylene. The batch absorbed thirteen grams of acetylene.

The mixture was neutralized with 130 grams of 23% aqueous acetic acid, whereupon two layers developed. The upper oil layer was dried and fractionally distilled.

The first fraction (a), amounting to four hundred grams and distilling at 40° C./32 mm.–80° C./4–6 mm., consisted of methallyl alcohol and dimethallyl carbonate.

A second fraction (b) amounted to six grams, distilling at 80°–122° C./6–7 mm. This was a mixture of dimethallyl carbonate and methallyl β-methalloxyacrylate.

A third fraction (c) was taken at 123°–140° C./6–7 mm., which amounted to ninety grams and consisted of 9.2% of methallyl β-methalloxyacrylate and 90.8% of methallyl β,β-dimethalloxypropionate.

There remained a fourth fraction (d) consisting of thirty grams of residue.

EXAMPLE 8

Into a one-liter, three-necked flask equipped with a gas-tight stainless steel stirrer, there were charged approximately four hundred cc. of anhydrous liquid ammonia and twenty-five grams of tetrahydrofurfuryl alcohol. Six grams of metallic sodium, cut into ¼" cubes, was added with stirring, whereupon a blue color developed. When this color had disappeared, the ammonia was evaporated, leaving the sodium tetrahydrofurfuroxide as a white powder. To the dry powder was added, with stirring, 345 grams of di-tetrahydrofurfuryl carbonate.

The flask was equipped with a thermometer, gas inlet tube, and gas outlet tube. The batch was heated, with stirring, to 85°–90° C. Acetylene, which was drawn from a commercial cylinder and scrubbed and dried as in Example 1, was pressed in at ten inches of mercury above atmospheric pressure. The batch absorbed thirteen grams of acetylene over a period of five hours. The reactor was cooled to room temperature with the reaction vessel maintained under pressure with acetylene. When cool, the batch was semi-solid in character.

Sixty-five grams of 23% aqueous acetic acid was added dropwise, with stirring, whereupon two layers developed. The batch was extracted with ether to facilitate separation of the layers. The upper layer of oil was removed and Claisen-distilled. The following fractions were obtained:

The first fraction (a), distilling at 34°–130° C./0.3 mm. and amounting to 224 grams, consisted of a mixture of tetrahydrofurfuryl alcohol and di-tetrahydrofurfuryl carbonate.

A second fraction (b) was obtained, amounting to seventeen grams, distilling at 182°–194° C./0.4 mm., having a refractive index, $n_D^{20}$, of 1.4780, and consisting of a mixture of 28% of tetrahydrofurfuryl β-tetrahydrofurfuroxyacrylate and 72% of tetrahydrofurfuryl β,β-di-tetrahydrofurfuroxypropionate, as determined by saponification number.

A third fraction (c) amounted to forty-six grams, distilling at 194°–197° C./0.4 mm. and having a refractive index, $n_D^{20}$, of 1.4172; a density, $$d_{20}^{20}$$

of 1.1607, and a saponification number of 159. This was tetrahydrofurfuryl β,β-di-tetrahydrofurfuroxypropionate, containing by analysis 60.10% of carbon and 8.28% of hydrogen (theory, 59.84% and 9.14%, respectively).

EXAMPLE 9

In a one-liter, three-necked flask, 9.8 grams of metallic potassium was added to anhydrous ethanol, denatured according to Formula 2B, in the manner described in Example 1. The excess ethanol was removed by vacuum distillation, leaving the potassium ethoxide as a dry powder. To the powdered alkoxide there was added at room temperature, with stirring, 295 grams of diethyl carbonate.

The flask was equipped with a thermometer and with gas inlet and outlet tubes, and the batch was heated under nitrogen to 80°–85° C. Commercial acetylene was pressed in at nine to ten inches of mercury above atmospheric pressure. The batch absorbed twenty-four grams of acetylene over a period of four hours, after which time the absorption of acetylene became slow. The mixture was cooled to room temperature with the reaction vessel maintained under pressure with acetylene.

There was added dropwise, with stirring, sixty-five grams of 23% acetic acid, whereupon two layers were formed. The upper layer, which was the oil layer, was separated and distilled. The following fractions were obtained:

The first fraction (a) amounted to 205 grams, distilled at 70° C./atm.–45° C./20 mm., and consisted of ethanol and diethylcarbonate.

A second fraction (b), consisting of forty-three grams, distilling at 70°–75° C./3 mm., and having a refractive index, $n_D^{20}$, of 1.4150, was composed of 8% of ethyl β-ethoxyacrylate and 92% of ethyl β,β-diethoxypropionate.

The third fraction (c) amounted to ten grams, distilled at 110°–114° C./3 mm., and had a refractive index, $n_D^{20}$, of 1.4310. This was diethyl α,α-diethoxysuccinate.

There was also obtained a fourth fraction (d) consisting of seven grams of residue.

EXAMPLE 10

Into a one-liter, three-necked flask equipped with a gas-tight stainless steel stirrer, there were charged approximately four hundred cc. of anhydrous liquid ammonia and 148 grams of tert.-butanol. There was added, with stirring, 11.5 grams of sodium metal in ¼″ cubes, whereupon a blue color developed. When the color had disappeared, the ammonia was evaporated and the excess tert.-butanol was removed by distillation under vacuum, leaving the sodium tert.-butoxide as a white powder.

There was added at room temperature, with stirring, 590 grams of diethyl carbonate. The flask was fitted with a gas inlet tube, with a gas outlet tube, and with a thermometer. After the flask was flushed with nitrogen, it was heated to 65° C. and acetylene, which was drawn from a commercial cylinder and scrubbed and dried as in Example 1, was pressed in at ten inches of mercury pressure above atmospheric. The temperature rose to 85°–90° C., and it was necessary to cool the reaction mixture by means of a water bath. Over a period of four hours, after which time the absorption of acetylene became slow, the batch absorbed twenty-one grams of acetylene. The flask was cooled to room temperature with the reaction vessel maintained under pressure with acetylene.

One hundred thirty grams of 23% aqueous acetic acid was added, with stirring, whereupon two layers developed. The upper oil layer was separated and fractionally distilled.

A first fraction (a), amounting to 537 grams and distilling at 82° C./atm.–62° C./54 mm., consisted of tert.-butanol and diethyl carbonate.

The second fraction (b) amounted to seventy grams, distilled at 37° C./0.1 mm.–75° C./2 mm., had a refractive index, $n_D^{20}$, of 1.4271, and consisted of 42% of ethyl β-ethoxyacrylate and 58% of ethyl β,β-diethoxypropionate.

The third fraction (c), which was taken at 110°–115° C./1 mm., amounted to forty grams and had a refractive index, $n_D^{20}$, of 1.4310. This was diethyl diethoxysuccinate.

A fourth fraction (d) was obtained, which consisted of twenty grams of a residue.

EXAMPLE 11

Into a one-liter, three-necked flask equipped with a gas-tight stainless steel stirrer, there were charged approximately five hundred cc. of anhydrous liquid ammonia and sixteen grams of methanol. There was added, with stirring, 11.5 grams of sodium metal cut into ¼″ cubes, whereupon a blue color appeared. When the mixture had become white, the ammonia was evaporated, leaving the sodium methoxide as a white powder.

There was added, with stirring, nine hundred grams of di-n-decyl carbonate. The flask was equipped with a gas inlet tube, a gas outlet tube, and a thermometer. The mixture was heated to 80°–85° C. and acetylene, scrubbed and dried as in Example 1, was pressed in at ten inches of mercury pressure above atmospheric. Over a period of five hours, the batch absorbed twenty-three grams of acetylene. The reactor was cooled to room temperature with the reaction vessel maintained under pressure with acetylene.

Then, with stirring, there was added dropwise 130 grams of 23% aqueous acetic acid, whereupon two layers developed. The upper layer of oil was removed, and 463 grams thereof was distilled. The following fractions were obtained:

The first fraction (a), amounting to 167 grams and distilling at 50° C./1 mm.–128° C./15 mm., was composed of n-decanol and di-n-decyl carbonate.

A second fraction (b) amounted to 185 grams, distilled at 200° C./0.15 mm., had a refractive index, $n_D^{20}$, of 1.4503, and a saponification number of 154. This fraction consisted of n-decyl-β-n-decoxyacrylate. This material, on standing in the cold, became a crystalline solid with a melting point of 28° C.

A third fraction (c) consisted of thirty grams of higher-boiling material, which cracked upon attempted distillation.

Fraction (b) was found by analysis to have 74.27% of carbon and 12.46% of hydrogen, compared with calculated values of 75.0% of carbon and 12.0% of hydrogen.

EXAMPLE 12

Into a one-liter, three-necked flask equipped with a gas-tight stainless steel stirrer, there were charged approximately 450 cc. of anhydrous liquid ammonia and 148 grams of tert.-butanol. There was added, with stirring, 19.5 grams of potassium in ¼" cubes, whereupon a blue color developed. When this color had disappeared, the ammonia was evaporated and the excess tert.-butanol removed by distillation in vacuo, leaving the potassium tert.-butoxide as a white powder.

There was added to the powdered tert.-butoxide at room temperature, with stirring, 590 grams of diethyl carbonate. The flask was equipped with a thermometer, a gas inlet tube, and a gas outlet tube. Acetylene, drawn from a commercial cylinder and scrubbed and dried as in Example 1, was pressed in at ten inches of mercury above atmospheric pressure. The temperature of the mixture rose rapidly from 29° C. to 45° C., and it was necessary to cool it with an ice bath. The batch absorbed twenty-three grams of acetylene over a period of four hours, after which time the absorption of acetylene became slow. The reactor was cooled to room temperature with the reaction vessel maintained under pressure with acetylene.

There ws added dropwise, with stirring, 139 grams of 23% aqueous acetic acid, whereupon two layers formed. The upper oil layer was separated and distilled. The following fractions were obtained:

The first fraction (a), amounting to 498 grams and distilling at 75° C.–126° C./atm., consisted of ethanol, tert.-butanol, and diethyl carbonate.

A second fraction (b), distilling at 50°–55° C./1 mm., amounted to fifty-three grams and was composed of 34% of ethyl β-ethoxyacrylate and 66% of ethyl β,β-diethoxypropionate.

A third fraction (c), amounting to fifty-six grams, distilling at 92°–104° C./2 mm., and having a refractive index, $n_D^{20}$, of 1.4352, was found to be a mixture of 81% of diethyl α,α-diethoxysuccinate and 19% of diethyl ethoxymaleate.

The fourth fraction (d) consisted of eleven grams of undistilled higher-boiling material.

EXAMPLE 13

Into a three-liter, three-necked pot equipped with a gas-tight stainless steel stirrer and gas inlet tube, there were charged approximately fifteen hundred cc. of anhydrous liquid ammonia. The ammonia was saturated with acetylene which was drawn from a commercial cylinder and scrubbed and dried as in Example 1. While the flow of acetylene was continued, pieces of sodium metal, in the shape of rods, were lowered on Nichrome wire into the ammonia solution. A blue color developed as the sodium dissolved, but the rate of addition of the sodium was controlled so that the blue color disappeared rapidly. In this manner, twenty-three grams of sodium was reacted over a period of one hour. The ammonia was evaporated, leaving the sodium acetylide as a dry powder. The reactor was immersed in a wet ice bath and 1180 grams of diethyl carbonate was added rapidly with stirring.

The flask was equipped with a thermometer and gas outlet tube. After the flask was flushed with acetylene, the batch was heated to 60°–65° C., and acetylene was pressed in at ten inches of mercury pressure above atmospheric. Over a period of four hours, after which time the acetylene absorption became slow, fifty-six grams of acetylene was absorbed.

There was added dropwise, with stirring, 260 grams of 23% aqueous acetic acid, whereupon two layers developed. The upper oil layer was separated and distilled. Following are the fractions which were obtained:

(a) The first fraction, amounting to 775 grams and distilling at 70° C./atm.–70° C./20 mm., was composed of ethanol and diethyl carbonate.

The second fraction (b) amounted to two hundred grams, distilled at 58°–62° C./1.5 mm., had a refractive index, $n_D^{20}$, of 1.4135, and consisted of 4% of ethyl β-ethoxyacrylate and 96% of ethyl β,β-diethoxypropionate.

The third fraction (c), amounting to sixty-four grams, distilling at 110°–120° C./3 mm., and having a refractive index, $n_D^{20}$, of 1.4305, consisted of diethyl α,α-diethoxysuccinate.

The fourth fraction (d) consisted of 183 grams of a residue of undistilled material.

EXAMPLE 14

Into a two-liter, three-necked flask equipped with a gas-tight stainless steel stirrer and gas inlet tube, there was charged approximately six hundred cc. of anhydrous liquid ammonia. The ammonia was saturated with acetylene which was drawn from a commercial cylinder and scrubbed and dried as in Example 1. While the flow of acetylene was continued, 23.0 grams of sodium, cut into ¼" cubes, was added. As each piece was added, a blue color developed and it was allowed to dissipate before the next piece of sodium was added. The ammonia was evaporated, leaving the sodium acetylide as a dry powder.

The reactor was cooled with a bath of ice and water. There was added, with stirring, nine hundred grams of dimethyl carbonate.

After being flushed with nitrogen, the batch was heated to 45° C. and acetylene was pressed in at ten inches of mercury pressure above atmospheric. Over a period of six hours, forty-three grams of acetylene was absorbed. The batch was cooled to room temperature with the reaction vessel maintained under pressure with acetylene.

Then, with stirring, 260 grams of 23% acetic acid was added dropwise, whereupon two layers developed. The upper oil layer was removed and distilled. The following fractions were obtained:

The first fraction (a), amounting to 536 grams, consisted of methanol and dimethyl carbonate.

The second fraction (b), which amounted to one hundred grams, distilled at 36°–40° C./2 mm., and had a refractive index, $n_D^{20}$, 1.4102, consisted of a mixture of 2% of methyl β-methoxyacrylate and 98% of methyl β,β-dimethoxypropionate.

A third fraction (c), amounting to 151 grams, distilling at 93°–105° C./2 mm., and having a refractive index, $n_D^{20}$, of 1.4320, consisted mostly of dimethyl α,α-dimethoxysuccinate.

A fourth fraction (d) consisted of 112 grams of higher-boiling material.

EXAMPLE 15

Into a two-liter, three-necked flask, there was charged approximately eight hundred cc. of anhydrous liquid ammonia. In the manner described in Example 13, twenty-three grams of sodium metal was reacted with acetylene in this medium. The ammonia was evaporated, leaving the sodium acetylide as a dry powder.

The flask was immersed in a bath of ice and water, and 1420 grams of diallyl carbonate was added rapidly with stirring. The flask was equipped with a thermometer and a gas outlet tube. After the apparatus was flushed with nitrogen, acetylene, which was drawn from a commercial cylinder and scrubbed and dried as in Example 1, was pressed in at ten inches of mercury above atmospheric pressure. The temperature rose to 35° C., and it was necessary to cool the reaction mixture by means of an ice bath. Over a period of six hours, after which time the acetylene absorption became slow, thirty-seven grams of acetylene was absorbed. The batch was cooled to room temperature with the reaction vessel maintained under pressure with acetylene.

There was added dropwise, with stirring, 260 grams of 23% aqueous acetic acid, whereupon two layers were formed. Approximately two hundred cc. of ether was added to the batch to facilitate separation. The upper oil layer was separated and distilled. Following are the fractions which were obtained:

The first fraction (a), amounting to 467 grams and distilling at 38° C./atm. to 70° C./27 mm., was composed of ether, allyl alcohol, and diallyl carbonate.

The second fraction (b), amounting to 566 grams and distilling at 71°–73° C./27 mm., was composed of diallyl carbonate.

A third fraction (c), which amounted to 108 grams and distilled at 108°–145° C./4 mm., consisted of a mixture of 7% of allyl β-alloxyacrylate and 93% of allyl β,β-dialloxypropionate.

The fourth fraction (d) was composed of 183 grams of undistilled higher-boiling material.

EXAMPLE 16

Into a two-liter, three-necked flask equipped with a gas-tight stainless steel stirrer and gas inlet tube, there was charged approximately eight hundred cc. of anhydrous liquid ammonia. Using the procedure described in Example 14, 11.5 grams of sodium metal was reacted with acetylene in this medium. The ammonia was evaporated, leaving the sodium acetylide as a dry powder.

Five hundred twenty-two grams of di-sec.-butyl carbonate was added rapidly with stirring. The temperature rose from 35° C. to 85° C., and it was necessary to cool the reaction mixture by means of an ice bath.

The reactor was equipped with a gas outlet tube and thermometer, and acetylene was pressed in at ten inches of mercury pressure above atmospheric. Over a period of four hours, after which time the absorption of acetylene became slow, twenty grams of acetylene was absorbed. The batch was cooled to room temperature with the reaction vessel maintained under pressure with acetylene.

One hundred thirty-five grams of 23% aqueous acetic acid was added dropwise with stirring, whereupon two layers formed. The upper oil layer was separated and distilled. Following are the fractions which were obtained:

The first fraction (a), amounting to 268 grams and distilling at 35°–85° C./25 mm., was composed of sec.-butanol and di-sec.-butyl carbonate.

The second fraction (b) distilled at 95°–115° C./5 mm. and amounted to sixty-four grams which, upon refractionation, gave thirty-one grams, distilling at 96°–98° C./3–4 mm. and having a refractive index, $n_D^{20}$, of 1.4450, which was identified as sec.-butyl β-sec.-butoxyacrylate, and thirty grams, distilling at 104°–105° C./3 mm. and having a refractive index, $n_D^{20}$, of 1.4325, which was identified as sec.-butyl β,β-di-sec. butoxypropionate.

There was also obtained another fraction (c), a residue of fifty-four grams.

EXAMPLE 17

In a two-liter, three-necked flask equipped with a gas-tight stainless steel stirrer and a gas inlet tube, twenty-four grams of powdered sodium acetylide was prepared in the manner described in Example 14. To the powdered acetylide there was added, with stirring, 786 grams of di-2-ethylhexyl carbonate at room temperature.

The reactor was equipped with a thermometer, gas inlet tube, and gas outlet tube. After being flushed with nitrogen, the batch was heated to 80°–85° C., and acetylene was pressed in at ten inches of mercury pressure above atmospheric. Over a period of six hours, after which time the acetylene absorption became slow, twenty-two grams of acetylene was absorbed. The batch was cooled to room temperature with the reaction vessel maintained under pressure with acetylene.

One hundred thirty grams of 23% aqueous acetic acid was added dropwise, with stirring, whereupon two layers developed. The upper layer of oil was separated, dried, and distilled from a Claisen flask. Following are the fractions which were obtained:

The first fraction (a) amounted to 216 grams, distilled at 67° C./4 mm.–166° C./1.5 mm., and consisted of 2-ethylhexanol and di-2-ethylhexyl carbonate.

The second fraction (b) amounted to 228 grams, distilled at 166°–210° C./1.5 mm., and had a refractive index, $n_D^{20}$, of 1.4450. Upon refractionation through a three-foot heated column packed with ⅛″ glass helices, this fraction yielded (1) fifty-five grams which distilled at 192°–203° C./4 mm. and which had a refractive index, $n_D^{20}$, of 1.4566; a density, $$d_{20}^{20}$$

of 0.9080, and a saponification number of 180, which fraction was identified as 2-ethylhexyl β-2-ethylhexoxyacrylate, and (2) 134 grams which distilled at 190°–195° C./1 mm., had a refractive index, $n_D^{20}$, of 1.4470; a density, $$d_{20}^{20}$$

of 0.8912, and a saponification number of 123, which was identified as 2-ethylhexyl β,β-di-2-ethylhexoxypropionate. The propionate was found to be compatible with resins and acted as a plasticizer therefor. Fraction (b) (1) was found to contain by analysis 73.59% of carbon and 12.33% of hydrogen compared to calculated values of 73.03% and 11.54%, respectively. Fraction (b) (2) was found on analysis to contain 73.20% of carbon and 12.16% of hydrogen, compared to theoretical values of 73.30% and 12.21%, respectively. A residue of 101 grams remained.

EXAMPLE 18

In a one-liter, three-necked flask equipped with a gas-tight stainless steel stirrer, there was prepared twelve grams of powdered sodium acetylide in the manner described in Example 14. To the powdered acetylide there was added at room temperature twenty-five grams of xylene to form a slurry.

The flask was cooled with an ice bath, and a solution of 339 grams of dicyclohexyl carbonate in one hundred grams of xylene was added rapidly.

The reactor was equipped with a gas inlet tube, a gas outlet tube, and a thermometer. After the apparatus was flushed with nitrogen, the mixture was heated to 85°–90° C. Acetylene, which was drawn from a commercial cylinder and scrubbed and dried as in Example 1, was pressed in at ten inches of mercury pressure above atmopheric. Over a period of five hours eight grams of acetylene was absorbed. The batch was cooled to room temperature with the reaction vessel maintained under pressure with acetylene.

There was added, with stirring, sixty-five grams of 23% aqueous acetic acid, whereupon two layers developed. Approximately 150 cc. of ether was added to facilitate separation. The upper layer of oil was separated. The ether and xylene were stripped off, and the remaining material was distilled from a Claisen flask to give the following fractions:

Fraction (a), amounting to 247 grams and distilling at 43°–130° C./2 mm., which consisted of cyclohexanol and dicyclohexyl carbonate.

Fraction (b), amounting to twenty-nine grams and distilling at 135°–160° C./2 mm., which was found to be composed of dicyclohexyl carbonate and cyclohexyl β-cyclohexoxyacrylate.

Fraction (c), which amounted to forty-two grams, distilled at 160°–170° C./1.8 mm., had a refractive index of 1.4875, a density, $$d_{20}^{20}$$

of 1.0231, and a saponification number of 156, which was identified as cyclohexyl β,β-dicyclohexoxypropionate.

Fraction (d) consisted of a residue of forty grams.

EXAMPLE 19

In a one-liter, three-necked flask equipped with a gas-tight stainless steel stirrer, there was prepared twelve grams of powdered sodium acetylide by the procedure described in Example 14. To the powdered acetylide there was added, with stirring, twenty-five grams of xylene to form a slurry. Then, with stirring and cooling, a solution of 363 grams of dibenzyl carbonate in two hundred grams of xylene was added.

The flask was equipped with a gas outlet tube and with a thermometer. After being flushed with nitrogen, the flask was heated to 80°–85° C. Acetylene, which was drawn from a commercial cylinder and scrubbed and dried as in Example 1, was pressed in at ten inches of mercury above atmospheric pressure. Over a period of five hours four grams of acetylene was absorbed. The reactor was cooled to room temperature with the reaction vessel maintained under pressure with acetylene.

Sixty-five grams of 23% aqueous acetic acid was added with stirring, whereupon two layers developed. The upper oil layer was separated and Claisen-distilled to give the following fractions:

The first fraction (a), which amounted to 437 grams and distilled at 38°–100° C./1.5 mm., consisted by xylene, benzyl alcohol, and dibenzyl carbonate.

The second fraction (b) amounted to ten grams which distilled at 160°–185° C./1.5 mm. and which was found to be composed of benzyl carbonate and benzyl β-benzoxyacrylate.

A third fraction (c), which amounted to seventeen grams, distilled at 185°–189° C./1.5 mm., had a refractive index, $n_D^{20}$, of 1.5655; a density, $$d_{20}^{20}$$

of 1.1137, and a saponification number of 196, was identified as a mixture of 89% of benzyl β-benzoxyacrylate and 11% of benzyl β,β-dibenzoxypropionate.

A fourth fraction (d) consisted of a residue of thirty-six grams.

EXAMPLE 20

Into a one-liter, three-necked flask equipped with a gas-tight stainless steel stirrer and a gas inlet tube, there was charged approximately four hundred cc. of anhydrous liquid ammonia. The ammonia was saturated with acetylene which was drawn from a commercial cylinder and scrubbed and dried as in Example 1. While the flow of acetylene was continued, 9.8 grams of potassium metal, cut into ¼" squares, was added. A blue color developed as the potassium dissolved, but the rate of addition of the potassium was controlled so that the blue color disappeared rapidly. When all of the acetylide had dissolved, the flow of acetylene was discontinued and the ammonia evaporated, leaving the potassium acetylide as a white powder. The flask was cooled by means of an ice bath, and there was added, with stirring, 230 grams of diethyl carbonate.

The reactor was equipped with a gas outlet tube and with a thermometer. After the apparatus was flushed with acetylene, the batch was heated to 35°–40° C. and acetylene, drawn from a commercial cylinder and scrubbed and dried as in Example 1, was pressed in at ten inches of mercury pressure above atmospheric. Over a period of four hours fifteen grams of acetylene was absorbed. The batch was cooled to room temperature with the reaction vessel maintained under pressure with acetylene.

There was added dropwise, with stirring, sixty-five grams of 23% aqueous acetic acid, whereupon two layers developed. The upper oil layer was separated and distilled to give the following fractions:

Fraction (a), amounting to 116 grams, which distilled at 75° C./atm.–50° C./2 mm. and was composed of ethanol and diethyl carbonate.

Fraction (b), which amounted to forty grams, distilled at 63°–70° C./2 mm., and had a refractive index, $n_D^{20}$, of 1.4180, and which was found to consist of 16% of ethyl β-ethoxyacrylate and 84% of ethyl β,β-diethoxypropionate.

Fraction (c), amounting to eight grams, distilling at 70°–105° C./2 mm., was found to be a mixture of ethyl β,β-diethoxypropionate and diethyl α,α-diethoxysuccinate.

Fraction (d), which amounted to thirty-four grams, distilled at 106°–110° C./2 mm., and had a refractive index, $n_D^{20}$, of 1.4303, was composed of diethyl α,α-diethoxysuccinate.

Fraction (e) consisted of a residue of thirty-four grams.

EXAMPLE 21

Into a one-liter, three-necked flask equipped with a gas-tight stainless steel stirrer and a gas inlet tube, there was charged approximately four hundred cc. of anhydrous liquid ammonia. The ammonia was saturated with acetylene which was drawn from a commercial cylinder and scrubbed and dried as in Example 1. While the flow of acetylene was continued, 1.7 grams of lithium, cut into small cubes, was added. A blue color developed as the lithium dissolved, but the rate of addition of the lithium was controlled so that the blue color disappeared rapidly. When all of the acetylide had dissolved, the flow of acetylene was stopped and the ammonia was evaporated, leaving the lithium acetylide as a white powder. The flask was cooled by means of an ice bath, and 295 grams of diethyl carbonate was added with stirring.

The flask was equipped with a gas outlet tube and with a thermometer. After the apparatus was flushed with nitrogen, the batch was heated to 35°–40° C. Acetylene was pressed in at ten inches of mercury pressure above atmospheric. No evidence of acetylene absorption by weight difference was noted after four hours. The batch was cooled to room temperature with the reaction vessel maintained under pressure with acetylene.

There was added, with stirring, sixty-five grams of 23% aqueous acetic acid, whereupon two layers were formed. The upper layer of oil was separated and distilled to give the following fractions:

A first fraction (a), which amounted to 234 grams, distilled at 75° C./atm.–60° C./12 mm., and consisted of ethanol and diethyl carbonate.

A second fraction (b), amounting to ten grams, distilling at 80°–130° C./12 mm., and having a refractive index, $n_D^{20}$, of 1.4395, which was composed of ethyl β-ethoxyacrylate, ethyl β,β-diethoxypropionate, and diethyl α,α-diethoxysuccinate.

A third fraction (c), which consisted of a residue of five grams.

EXAMPLE 22

In a five hundred cc., three-necked flask, there was prepared twelve grams of sodium acetylide in the manner described in Example 14. In a one-liter, three-necked flask, there were charged approximately four hundred cc. of liquid ammonia and a small amount of ferric nitrate. There was added, with stirring, 5.8 grams of sodium in ¼″ squares. A blue color developed as the sodium dissolved. When the formation of sodamide was complete, the blue turned to gray. The liquid ammonia solution of the sodium acetylide was poured into the sodamide suspension. The mixture was agitated for two hours. The ammonia was evaporated, the last traces being removed by suction, leaving the disodium acetylide as a white powder. There was added, with stirring and cooling, 450 grams of dimethyl carbonate. The temperature was maintained at 35°–40° C. by means of an ice bath, and acetylene was pressed in at nine to ten inches of mercury pressure above atmospheric. Over a period of six hours thirty grams of acetylene was absorbed.

Sixty-five grams of 23% acetic acid was added, with stirring, whereupon two layers developed. The oil layer was separated and distilled to give the following fractions:

Fraction (a), amounting to 250 grams and distilling at 60°–91° C./atm., which was composed of methanol and dimethyl carbonate.

Fraction (b), amounting to forty grams and distilling at 60°–70° C./15 mm., which was identified as methyl β,β-dimethoxypropionate.

Fraction (c), amounting to eighty-five grams and distilling at 75° C./10 mm.–92° C./2 mm., identified as methyl β,β-dimethoxysuccinate.

Fraction (d), consisting of a residue of forty grams.

EXAMPLE 23

In a one-liter, three-necked flask, there was prepared sixteen grams of potassium acetylide in the manner described in Example 20. Into a one-liter, three-necked flask there were charged approximately four hundred cc. of liquid ammonia and a catalytic amount of ferric nitrate. There was added, with stirring, 9.8 grams of potassium metal, cut into ¼″ cubes. A blue color developed as the potassium dissolved. When the conversion to potassium amide was complete, the blue color disappeared. The liquid ammonia solution of the potassium acetylide was poured, with stirring, into the potassium amide suspension. The mixture was agitated for two hours. The ammonia was evaporated, leaving dipotassium acetylide as a white powder. It was found that, when it was attempted to add diethyl carbonate directly to dipotassium acetylide, the reaction was too rapid to be controlled and an explosion resulted. It is necessary, in order to utilize a catalyst of this vigor, to dilute the reactants and mix very slowly.

EXAMPLE 24

Into a one-liter, three-necked flask equipped with a gas-tight stainless steel stirrer and reflux condenser, there was charged one hundred cc. of anhydrous ethanol denatured according to Formula 2B. To the stirred ethanol there was added 2.9 grams of metallic sodium, cut into ¼″ cubes, over a period of fifteen minutes. When all of the sodium had dissolved, the excess ethanol was removed by distilling under vacuum, leaving the sodium ethoxide as a white powder. To the sodium ethoxide there was added 150 grams of diethyl carbonate at room temperature. The mixture was agitated rapidly for five minutes at room temperature.

This mixture was charged to a small fluid-jacketed rocker bomb of three hundred cc. capacity with an inside diameter of 1.5 inches. The vessel was thermostatically controlled at 85° C., and acetylene was pressed in to eighty pounds gauge. These conditions were maintained for five hours, at which time the temperature was reduced and pressure was reduced to atmospheric.

The mixture was transferred to a one-liter, three-necked flask and there was added dropwise, with stirring and cooling, thirty-three grams of 23% aqueous acetic acid, whereupon two layers developed. The upper oil layer was separated and distilled through a one-foot column to give the following fractions:

The first fraction (a) amounted to sixty-six grams, distilled at 60° C./atm.–50° C./40 mm., and consisted of ethanol and diethyl carbonate.

A second fraction (b) amounted to sixty-five grams, distilled at 56°–62° C./1 mm., had a refractive index, $n_D^{20}$, of 1.4178, and was found to consist of 10% of ethyl β-ethoxyacrylate and 90% of ethyl β,β-diethoxypropionate.

A third fraction (c) consisted of eighteen grams of higher-boiling material which was not further worked up.

EXAMPLE 25

Into a one-liter, three-necked flask equipped with a gas-tight stainless steel stirrer, there was charged 82.5 grams of 55% solution of benzyl trimethyl ammonium methoxide in methanol. The excess methanol was removed by distilling under vacuum, leaving the benzyl trimethyl ammonium methoxide, with an equimolecular part of methanol, as a syrupy liquid. Six hundred twenty-five grams of dimethyl carbonate and 26.8 grams of methyl methoxyacrylate were added, with cooling, to the stirred methoxide.

The flask was then equipped with a gas inlet tube extending into the liquid, a thermometer, and a gas outlet tube. After the apparatus was flushed with nitrogen, the mixture was agitated rapidly and acetylene was pressed in at ten inches of mercury pressure above atmospheric. The temperature rose rapidly to 40° C., and it was necessary to cool the mixture by means of an ice bath over a period of one-half hour. Acetylene was pressed in over a period of two hours, after which time the rate of absorption became slow. There was absorbed thirty-three grams of acetylene. The batch was cooled to room temperature with the reaction vessel maintained under pressure with acetylene.

There was added dropwise, with stirring, a solution of fifteen grams of glacial acetic acid in sixty-five grams of water, whereupon two layers developed. The upper layer of oil was separated and distilled to give the following fractions:

Fraction (a), which amounted to 463 grams, distilled at 60° C./atm. to 60° C./90 mm., and consisted of methanol and dimethyl carbonate.

Fraction (b), amounting to eighty grams, distilling at 40°–65° C./3–4 mm., having a refractive index, $n_D^{20}$, of 1.4123, which was found to consist of a mixture of 7% of methyl β-methoxyacrylate and 93% of methyl β,β-dimethoxypropionate.

Fraction (c), which amounted to 110 grams, distilled at 90°–100° C./2 mm., had a refractive index, $n_D^{20}$, of 1.4339, and was composed chiefly of dimethyl α,α-dimethoxysuccinate.

There remained a residue of fourteen grams.

EXAMPLE 26

Into a five hundred cc., three-necked flask equipped with a gas-tight stainless steel stirrer, there was charged 117 grams of a 19% solution of benzyl trimethyl ammonium ethoxide in ethanol. The excess ethanol was removed by distillation under vacuum, leaving the benzyl trimethyl ammonium ethoxide, with an equimolecular part of ethanol, as a syrupy liquid. To the stirred ethoxide there were added, with cooling, 169 grams of diethyl carbonate and 20.6 grams of ethyl ethoxyacrylate.

The flask was then equipped with a gas inlet tube, a thermometer, and a gas outlet tube. After the apparatus was flushed with nitrogen, the mixture was agitated rapidly and acetylene was pressed in at ten inches of mercury pressure above atmospheric. The temperature rose rapidly to 45° C., and it was necessary to cool the mixture intermittently by means of an ice bath for one-half hour. Acetylene was pressed in over a period of one and one-half hours, after which time the absorption became slow. The reactor was cooled to room temperature with the reaction vessel maintained under pressure with acetylene.

There was added dropwise, with stirring, a solution of 8.6 grams of glacial acetic acid in 28.6 grams of water, whereupon two layers developed. The upper layer of oil was separated and distilled. Following are the fractions which were obtained:

Fraction (a), amounting to 112 grams, distilling at 65° C./atm. to 90° C./40 mm., which was composed of ethanol and diethyl carbonate.

Fraction (b), which amounted to sixty-eight grams, distilled at 55°–70° C./1–2 mm., had a refractive index, $n_D^{20}$, of 1.4168, and which consisted of a mixture of 13% of ethyl β-ethoxyacrylate and 87% of ethyl β,β-diethoxypropionate.

Fraction (c), amounting to eleven grams, distilling at 90°–110° C./1–2 mm., and having a refractive index, $n_D^{20}$, of 1.4355, which was found to be a mixture of 80% of diethyl α,α-diethoxysuccinate and 20% of diethyl α-ethoxymaleate.

EXAMPLE 27

Into a five hundred cc., three-necked flask equipped with a gas-tight stainless steel stirrer, gas inlet and outlet tubes, and thermometer, there were charged 328 grams of di-2-butoxyethyl carbonate, seven grams of commercial sodium methylate, and fifteen grams of methyl β-methoxyacrylate. After the apparatus was flushed with nitrogen, the mixture was heated to 83°–87° C. Acetylene, which was scrubbed and dried as in Example 1, was pressed in at ten inches of mercury pressure above atmospheric. Over a period of five hours the batch absorbed seven grams of acetylene. The reactor was cooled to room temperature with the reaction vessel maintained under pressure with acetylene.

Then, with stirring, there was added dropwise thirty-four grams of 23% aqueous acetic acid, whereupon two layers developed. The upper layer of oil was separated and Claisen-distilled. The following fractions were obtained:

The first fraction (a) amounted to 280 grams, distilled at 60° C./20 mm.–135° C./0.5 mm., and was found to consist of methyl β,β-dimethoxypropionate, butyl Cellosolve, and di-2-butoxyethyl carbonate.

A second fraction (b) amounted to sixteen grams, distilled at 135°–175° C./0.5 mm., had a refractive index, $n_D^{20}$, of 1.4459 and a saponification number of 165, and was composed of a mixture of 62.5% of 2-butoxyethyl β-2-butoxyethoxyacrylate and 37.5% of 2-butoxyethyl β,β-di(2-butoxyethoxy)propionate.

A third fraction (c), amounting to twenty grams, distilling at 175°–185° C./0.5 mm., and having a refractive index, $n_D^{20}$, of 1.4400 and a saponification number of 136, was composed of 2-butoxyethyl β,β-di(2-butoxyethoxy)propionate.

A fourth fraction (d) consisted of five grams of higher-boiling material.

EXAMPLE 28

Into a one-liter three-necked flask equipped with a gas-tight stainless steel stirrer and drying tube, there were charged approximately two hundred cc. of anhydrous liquid ammonia and 10.7 grams of β-dimethylaminoethanol. There was added, with stirring, 2.8 grams of sodium in ¼" cubes, whereupon a blue color appeared. When this color had disappeared, the ammonia was evaporated, leaving the sodium β-dimethylaminoethoxide as a white powder. With stirring, there was added to the powdered alkoxide 244 grams of bis-(β-dimethylaminoethyl)carbonate at room temperature.

The flask was then equipped with gas inlet and outlet tubes and with a thermometer, and the batch was heated to 85° C. Acetylene, which was drawn from a commercial cylinder and scrubbed and dried as in Example 1, was pressed in at ten inches of mercury pressure above atmospheric. Over a period of four and one-half hours 5.4 grams of acetylene was absorbed. The batch was cooled to room temperature with the reaction vessel maintained under pressure with acetylene.

The batch was poured into one thousand cc. of anhydrous ether. The resulting mixture was filtered free of solids. The filtrate was stripped of ether by heating it on a steam bath and applying suction from a water pump. The material remaining was flash-distilled, leaving eight grams of high-boiling material. The flash distillate was Claisen-distilled and gave the following fractions:

Fraction (a), amounting to 167 grams, distilling at 30° C./0.3 mm.–81° C./0.1 mm., and consisting of β-dimethylaminoethanol and bis-(β-dimethylaminoethyl) carbonate.

Fraction (b), which amounted to fourteen grams, distilled at 80°–105° C./0.1 mm., had a refractive index, $n_D^{20}$, of 1.4560, and which was found to consist of bis-(β-dimethylaminoethyl)-carbonate and β-dimethylaminoethyl β'-(β-dimethylaminoethoxy)acrylate.

Fraction (c), which amounted to sixteen grams, distilled at 105°–115° C./0.1 mm., had a refractive index, $n_D^{20}$, of 1.4652, and which was found to be composed of 66% of β-dimethylaminoethyl β'-(β-dimethylaminoethoxy)acrylate and 34% of β-dimethylaminoethyl β',β'-di-(β-dimethylaminoethoxy)propionate.

Fraction (d) consisted of four grams of higher-boiling material.

Fractions (b) and (c) were carefully redistilled to give pure β-dimethylaminoethyl β'-(β-dimethylaminoethoxy)acrylate having a refractive index, $n_D^{20}$, of 1.4717 and pure β-dimethylaminoethyl β',β'-di-(β-dimethylaminoethoxy)-propionate having a refractive index, $n_D^{20}$, of 1.4524. The per cent of β-dimethylaminoethyl β'-(β-dimethylaminoethoxy)acrylate to β-dimethylaminoethyl β',β'-di(β-dimethylaminoethoxy)propionate in mixtures can be determined from the refractive index thereof by reference to straight-line graph between these two values.

EXAMPLE 29

Into a three-liter, three-necked flask there was charged 440 grams of a 20.1% methanolic solution of diisopropylbenzyl trimethyl ammonium methoxide. The excess methanol was removed by distilling under vacuum, leaving the diisopropylbenzyl trimethyl ammonium methoxide, with an equimolecular part of methanol, as a semi-solid. There was added at room temperature, with stirring, 945 grams of dimethyl carbonate.

The flask was then equipped with gas inlet and outlet tubes and with a thermometer. After the apparatus was flushed with acetylene and scrubbed and dried as in Example 1, the batch was agitated at 400±5 revolutions per minute, and acetylene was pressed in at ten inches of mercury pressure above atmospheric. The temperature rose rapidly to 45° C., and it was necessary to cool the mixture by means of an ice bath over a period of one-half hour. Acetylene was pressed in over a period of two hours, after which time the absorption of acetylene became slow. The reactor was cooled to room temperature with the reaction vessel maintained under pressure with acetylene.

There was added dropwise, with stirring, ninety-one grams of 23% aqueous acetic acid, whereupon two layers developed. To facilitate separation, three hundred cc. of ether was added. The upper oil layer was distilled to give the following fractions:

The first fraction (a), which distilled between 35° and 60° C., consisted mainly of ether.

The second fraction (b) amounted to 370 grams, distilled at 60–92° C./atm., and was composed of methanol and dimethyl carbonate.

A third fraction (c) amounted to forty-nine grams, distilled at 70°–77° C./20 mm., had a refractive index, $n_D^{20}$, of 1.4160, and was composed of 17% of methyl β-methoxyacrylate and 83% of methyl β,β-dimethoxypropionate.

A fourth fraction (d) amounted to five grams, distilled at 77° C./20 mm.–90° C./1 mm., and was composed of methyl β,β-dimethoxypropionate and dimethyl α,α-dimethoxysuccinate.

A fifth fraction (e) amounted to eighty-three grams, distilled at 90°–99° C./1 mm., had a refractive index, $n_D^{20}$, of 1.4455, and consisted chiefly of dimethyl β,β-dimethoxysuccinate.

A sixth fraction (f) consisted of fifty-five grams of higher-boiling material.

EXAMPLE 30

Into a three-liter, three-necked flask, there was charged 206 grams of a 34.7% solution of dibenzyl dimethyl ammonium methoxide in methanol. The excess methanol was removed by distilling under reduced pressure, leaving the dibenzyl dimethyl ammonium methoxide, with an equimolecular part of methanol, as a semi-solid. There was added at room temperature (28° C.), with stirring, 675 grams of dimethyl carbonate.

The flask was then equipped with gas inlet tube, gas outlet tube, and thermometer. After the apparatus was flushed with acetylene and scrubbed and dried as in Example 1, the batch was agitated at 400±5 revolutions per minute, and acetylene was pressed in at ten inches of mercury pressure above atmospheric. After a period of one hour, during which time there was only slight absorption of acetylene, there was added from a dropping funnel twenty-nine grams of methyl β-methoxyacrylate, whereupon the temperature rose rapidly to 40° C. Acetylene was pressed in over a period of four hours. The batch absorbed sixteen grams of acetylene.

Sixty-five grams of 23% aqueous acetic acid was added dropwise with stirring, whereupon two layers developed. The upper layer of oil was separated and distilled to give the following fractions:

Fraction (a), amounting to 628 grams, distilling at 75°–105° C./atm., and consisting of methanol and dimethyl carbonate.

Fraction (b), amounting to fifty-two grams, distilling at 75°–95° C./20 mm., having a refractive index, $n_D^{20}$, of 1.4097, and consisting of methyl β,β-dimethoxypropionate.

Fraction (c), amounting to nine grams, distilling at 95°–120° C./20 mm., and consisting of a mixture of methyl β,β-dimethoxypropionate and higher-boiling materials.

Fraction (d), amounting to thirty-eight grams of higher-boiling material.

EXAMPLE 31

Into a three-liter, three-necked flask equipped with a gas-tight stainless steel stirrer, there was charged 291 grams of a 23% solution of tetramethyl ammonium methoxide in methanol. The flask was immersed in a water bath maintained at 30°–35° C., and the excess methanol was removed by distillation at reduced pressure, leaving the tetramethyl ammonium methoxide, with one mole of methanol, as a semi-solid weighing 88.8 grams.

At room temperature there was added 1744 grams of dimethyl carbonate. The flask was equipped with gas inlet and outlet tubes and with a thermometer. After the apparatus was flushed with acetylene, the batch was agitated at a speed of 400±5 revolutions per minute, and acetylene was pressed in at ten inches of mercury pressure above atmospheric. The temperature rose rapidly to 50° C., and it was necessary to cool the mixture by means of an ice bath. Over a period of two hours, after which time the absorption of acetylene became slow, seventy grams of acetylene was absorbed. The batch was cooled to room temperature with the reaction vessel maintained under pressure with acetylene.

There was added dropwise, with stirring, at room temperature 168 grams of 23% aqueous acetic acid, whereupon two layers developed. Ether was added to facilitate separation. The upper oil layer was separated and distilled. The following fractions were obtained:

Fraction (a), which consisted of ether.

Fraction (b), which amounted to 395 grams, distilled at 75°–92° C./atm., and was found to consist of water, methanol, and dimethyl carbonate.

Fraction (c), which amounted to 143 grams, distilled at 75°–95° C./20 mm., had a refractive index, $n_D^{20}$, of 1.4170, and was composed of 18% of methyl β-methoxyacrylate, and 82% of methyl β,β-dimethoxypropionate.

Fraction (d), which amounted to 152 grams, distilled at 95°–130° C./1 mm., had a refractive index, $n_D^{20}$, of 1.4330, and consisted chiefly of dimethyl α,α-dimethoxysuccinate.

Fraction (e), which was composed of five grams of higher-boiling materials.

EXAMPLE 32

Into a three-liter, three-necked flask, there was charged 590 grams of a 33% solution of benzyl trimethyl ammonium ethoxide in ethanol. In the manner described in Example 26, the excess ethanol was removed by vacuum distillation, leaving the semi-solid benzyl trimethyl ammonium monoethanolate. There was added 3893 grams of diethyl carbonate. As in Example 26, the mixture was treated with acetylene. Over a period of eight hours, 191 grams of acetylene was absorbed. There was added dropwise, with stirring and cooling by means of an ice bath, 153 grams of 23% aqueous hydrochloric acid, whereupon two layers developed. The upper layer of oil was separated and distilled to give the following fractions:

The first fraction (a), amounting to 2974 grams, distilling at 70° C./atm.–65° C./20 mm., which was found to consist of ethanol and diethyl carbonate.

A second fraction (b), amounting to 62 grams, distilling at 65°–90° C./20 mm., having a refractive index, $n_D^{20}$, of 1.4059, and which was found to consist of 83% of diethyl carbonate and 17% of ethyl β-ethoxyacrylate.

A third fraction (c), amounting to 634 grams, distilling at 65°–73° C./4 mm., which consisted of 18% of ethyl β-ethoxyacrylate and 72% of ethyl β,β-diethoxypropionate.

A fourth fraction (d), amounting to eighty grams, distilling at 73°–100° C./4 mm., which was found to consist of 60% of ethyl β,β-diethoxypropionate and 40% of diethyl α,α-diethoxysuccinate.

A fifth fraction (e), amounting to 226 grams, distilling at 100°–120° C./4 mm., which was found to consist of 85% of diethyl α,α-diethoxysuccinate and 15% of diethyl ethoxymaleate.

A sixth fraction (f), amounting to forty-six grams of higher-boiling material.

EXAMPLE 33

Into a three-liter, three-necked flask, there was charged 295 grams of a 33% solution of benzyl trimethyl ammonium ethoxide in ethanol. In the manner previously described, the excess ethanol was removed by vacuum distillation (see Example 26), leaving the benzyl trimethyl ammonium ethoxide as a syrupy mixture. There was added a room temperature 1770 grams of diethyl carbonate. As in Example 26, the mixture was treated with acetylene. Over a period of four hours, ninety-two grams of acetylene was absorbed. There was added dropwise, with stirring and cooling by means of an ice bath, sixty-nine grams of a solution of 26.4% of hydrogen chloride in ethanol. The flask was immersed in a water bath at 30°–35° C., and 384 grams was stripped from the flask by vacuum distillation. The remaining material was filtered with the aid of suction through a bed of sixty grams of diatomaceous earth. The residue was washed with three hundred grams of diethyl carbonate and approximately one hundred cc. of anhydrous diethyl ether. The residue, after being vacuum-dried at room temperature, weighed seventy-one grams. The strippings and filtrate were combined and fractionated to give the following, after a forerun of ether, alcohol, and diethyl carbonate.

Fraction (a), which amounted to 130 grams, distilled at 60°–65° C./2 mm., had a refractive index, $n_D^{20}$, of 1.4320, and consisted of 48.5% of ethyl ethoxyacrylate and 51.5% of ethyl diethoxypropionate.

Fraction (b), which mounted to sixty grams, distilled at 65°–80° C./2 mm., had a refractive index, $n_D^{20}$, of 1.4248, and consisted of 40.9% of ethyl ethoxyacrylate and 59.1% of ethyl diethoxypropionate.

Fraction (c), which amounted to twenty-four grams, distilled at 80°–105° C./2 mm., had a refractive index, $n_D^{20}$, of 1.4320, and consisted of 5.3% of ethyl diethoxypropionate and 94.7% of ethyl diethoxysuccinate.

Fraction (d), which amounted to 104 grams, distilled at 105°–120° C./2 mm., had a refractive index, $n_D^{20}$, of 1.4350, and consisted of 82% of ethyl diethoxysuccinate and 18% of ethyl ethoxymaleate.

Fraction (e), which consisted of eighty-two grams of residue.

By reaction of acetylene and an ester of carbonic acid and a non-tertiary, monohydric alcohol in the presence of an alkaline catalyst, there are obtained compounds of the general formula

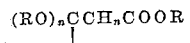

where R is the non-hydroxylated residue of a monohydric alcohol which does not react with a strong alkali, R' is a member of the class consisting of hydrogen and the group —COOR, and $n$ is an integer from one to two. When $n$ has a value of two and R' is hydrogen, the compounds formed are di-$\beta$-ether-substituted propionates, $(RO)_2CHCH_2COOR$. When $n$ has a value of one and R' is hydrogen, the compounds obtained are $\beta$-ether-substituted acrylates, $ROCH=CHCOOR$. When $n$ is two and R' represents a carbo-oxy group, —COOR, there are at hand di-ether-substituted succinates,

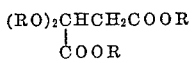

The somewhat comparable product, when $n$ is one, may be represented:

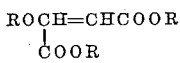

All of these types of esters are closely related not only as to their method of formation but also as to type of substituent groups and molecular structure.

We claim:

1. The process which comprises reacting in the presence of an alkaline catalyst acetylene and a diester of carbonic acid and a non-tertiary, monohydric alcohol, the non-hydroxylated residue of which does not react with a strongly alkaline hydroxide, said catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

2. The process which comprises reacting at 20° C. to 110° C. in the presence of an alkaline catalyst acetylene and a di-ester of carbonic acid and a non-tertiary, monohydric alcohol, the residue of which does not react with a strongly alkaline hydroxide, said catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substitutes, two to four of the N-substituents are supplied by the methyl group, and the benzyl nucleus makes up any needed balance of the five N-substitutents, destroying the alkaline catalyst in the reaction mixture, and separating therefrom esters of ether acids.

3. A process which comprises reacting between 40° and 90° C. in the presence of an alkaline catalyst acetylene and di-esters of carbonic acid and non-tertiary, monohydric alcohols which contain a residue which does not react with strongly alkaline hydroxide, said catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents, neutralizing the alkaline catalyst in the reaction mixture, and separating therefrom esters of the formula $(RO)_nCHCH_nCOOR$, wherein R is the residue of a non-tertiary monohydric alcohol which does not react with a strongly alkaline hydroxide and $n$ is an integer from one to two.

4. The process which comprises reacting in the presence of an alkaline catalyst at temperatures of 40° C. to 90° C. acetylene and diesters of carbonic acid and non-tertiary, monohydric alcohols, ROH, said catalyst being an alkali metal acetylide, neutralizing the alkaline catalyst in the reaction mixture, and separating therefrom esters of the formula $(RO)_nCHCH_nCOOR$, wherein R is a monovalent hydrocarbon group attached to oxygen at a non-tertiary carbon atom and composed of not over eighteen carbon atoms and $n$ is an integer from one to two.

5. The process which comprises reacting in the presence of a benzyl trimethyl ammonium alkoxide, as an alkaline catalyst, in which the alkoxide group contains one to four carbon atoms, in the temperature range of 40° C. to 90° C. acetylene and diesters of carbonic acid and non-tertiary, monohydric alcohols, ROH, wherein R is a hydrocarbon group containing not over eighteen carbon atoms, neutralizing the alkaline catalyst in the reaction mixture, and separating therefrom esters of the formula

wherein $n$ is an integer from one to two and R is the above-defined hydrocarbon group.

6. The process which comprises reacting in the temperature range of 20° C. to 110° C. in the presence of an alkaline catalyst acetylene and a diester, $(RO)_2CO$, of carbonic acid and a non-tertiary monohydric alcohol, ROH, wherein R is a hydrocarobn group of one to eighteen carbon atoms, destroying the alkaline catalyst in the reaction mixture, and separating therefrom ether esters, said alkaline catalyst being a member of the class consisting of (a) alkali metal acetylides, (b) alkali metal alcoholates in which the alcohol residue contains not over twelve carbon groups, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

7. The process which comprises reacting in the temperature range of 40° C. to 90° C. in the presence of an alkaline catalyst acetylene and a diester, $(RO)_2CO$, of carbonic acid and a saturated, non-tertiary, monohydric aliphatic alcohol, ROH, of one to eighteen carbon atoms, R being an alkyl group, destroying the alkaline catalyst in the reaction mixture, and separating therefrom ether esters, said alkaline catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

8. The process which comprises reacting in the temperature range of 40° C. to 90° C. in the presence of a quaternary ammonium alcoholate in which an alcoholate group is an alkoxide group of one to four carbon atoms and is one of the five N-substituents, two to four of the N-substituents are methyl groups, and any remaining N-substituents are supplied by the benzyl nucleus acetylene and a diester, $(RO)_2CO$, of carbonic acid and a saturated, non-tertiary, aliphatic, monohydric alcohol, ROH, R being an alkyl group of not over eighteen carbon atoms, destroying the catalyst in the reaction mixture, and separating therefrom ether esters.

9. The process which comprises reacting in the temperature range of 40° C. to 90° C. in the presence of a benzyl trimethyl ammonium alkoxide as an alkaline catalyst, the alkoxide group thereof containing one to four carbon atoms, acetylene and a diester, $(RO)_2CO$, of carbonic acid and a saturated, non-tertiary, aliphatic, monohydric alcohol, ROH, R being an alkyl group of not over ten carbon atoms, destroying the catalyst in the reaction mixture by neutralizing with acid, and separating therefrom ether esters.

10. The process which comprises reacting in the presence of an alkaline catalyst and an alkyl β-alkoxyacrylate, $ROCH=CHCOOR$, within the temperature range of 40° C. to 90° C. acetylene and a diester, $(RO)_2CO$, of carbonic acid and a saturated, non-tertiary, aliphatic, monohydric alcohol, ROH, R in the above formulas being an alkyl group of one to eighteen carbon atoms, destroying the catalyst in the reaction mixture, and separating therefrom ether esters, said alkaline catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

11. The process which comprises reacting in the presence of an alkaline catalyst and ethyl β-ethoxyacrylate in the temperature range of 40° C. to 90° C. acetylene and diethyl carbonate, destroying the alkaline catalyst in the reaction mixture, and separating therefrom esters of the formula $(C_2H_5O)_nCHCH_nCOOC_2H_5$, wherein $n$ is an integer from one to two, said alkaline catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

12. A process which comprises reacting in the presence of a quaternary ammonium alkoxide in which an alkoxide group of one to four carbon atoms is one of the five N-substituents, two to four of the N-substituents are methyl groups, and any remaining N-substituent is supplied by the benzyl nucleus within the temperature range of 40° C. to 90° C. acetylene and diethyl carbonate, destroying the said ammonium alkoxide in the reaction mixture, and separating therefrom ethyl esters of the formula $(RO)_nC(R')CH_nCOOR$, wherein R is the ethyl group, R' represents a member of the class consisting of hydrogen and the —COOR group, and $n$ is an integer having a value from one to two.

13. A process which comprises reacting in the presence of a quaternary ammonium alkoxide in which an alkoxide group of one to four carbon atoms is one of the five N-substituents, two to four of the N-substituents are methyl groups, and any remaining N-substituent is supplied by the benzyl nucleus in the temperature range of 40° C. to 90° C. acetylene and dibutyl carbonate, destroying the said ammonium alkoxide in the reaction mixture, and separating therefrom butyl esters of the formula $(RO)_nC(R')CH_nCOOR$, wherein R is the butyl group, R' represents a member of the class consisting of hydrogen and the —COOR group, and $n$ is an integer having a value from one to two.

14. The process which comprises reacting in the presence of a benzyl trimethyl ammonium alkoxide in which the alkoxide group has one to four carbon atoms in the temperature range of 40° C. to 90° C. acetylene and dibutyl carbonate, destroying said ammonium alkoxide in the reaction mixture, and separating therefrom esters of the formula $(C_4H_9O)_nCHCH_nCOOC_4H_9$, wherein $n$ is an integer from one to two.

15. The process which comprises reacting in the presence of an alkaline catalyst in the temperature range of 40° C. to 90° C. acetylene and dimethyl carbonate, destroying the alkaline catalyst in the reaction mixture, and separating therefrom methyl β,β-di(methoxy)propionate, said alkaline catalyst being a member of the class consisting of (a) alkali metal acetylides, (b) alkali metal alcoholates in which the alcohol residue contains not over twelve carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

16. The process of claim 15 wherein the catalyst is benzyl trimethyl ammonium methoxide.

WILLARD J. CROXALL.
HENRY J. SCHNEIDER.

No references cited.